United States Patent

[11] 3,581,216

[72] Inventor Louis A. Stevenson, Jr.
4010 Overbrook, Houston, Tex. 77027

[21] Appl. No. 685,391
[22] Filed Nov. 24, 1967
[45] Patented May 25, 1971

[54] PULSE GENERATOR AND ENCODER
8 Claims, 4 Drawing Figs.

[52] U.S. Cl. 328/61, 179/5, 179/90, 307/221, 328/37, 328/195
[51] Int. Cl. H03m 1/26
[50] Field of Search 328/37, 59, 60, 61, 195, 94, 75; 307/220, 221, 269; 179/90 B, 5

[56] References Cited

UNITED STATES PATENTS

| | | | |
|---|---|---|---|
| 3,117,307 | 1/1964 | Davie | 328/37X |
| 3,184,612 | 5/1965 | Petersen | 307/221 |
| 3,259,240 | 7/1966 | Schneider | 328/37X |
| 3,322,974 | 5/1967 | Ahrons et al. | 307/221X |
| 3,421,092 | 1/1969 | Bower et al. | 307/221X |
| 3,168,700 | 2/1965 | Gesek et al. | 328/75X |

*Primary Examiner*—Donald D. Forrer
*Assistant Examiner*—R. C. Woodbridge
*Attorneys*—Tom Arnold, Bill Durkee, Frank S. Vaden, III, Robert A. White, Louis T. Pirbey and Fohn F. Lynch

ABSTRACT: A pulse generating circuit particularly useful as an encoder for automatic electronic dialing equipment including a plurality of serially connected first monostable circuits, a plurality of serially connected second monostable circuits with gate means connected therebetween, means connecting each of said first monostable circuits to the first circuit of said second monostable circuit, means for connecting each said first monostable circuits to a control terminal of said gate means, and means connected with each of said second monostable circuits for receiving a pulse train. Each of the first monostable circuits may correspond to a digit of a plural digit number, and each of the second monostable circuits may correspond to a value of each digit.

Figure 4:
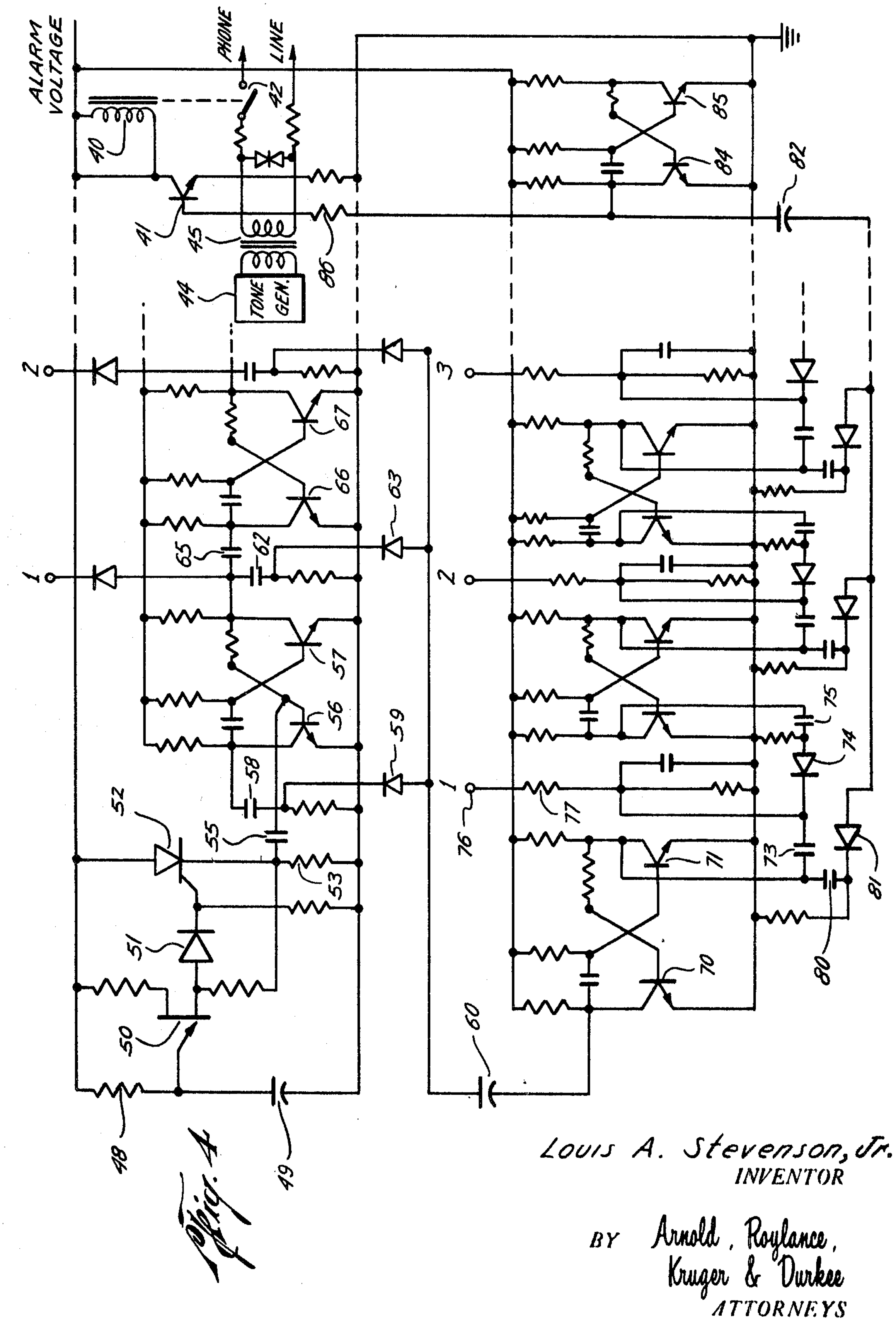

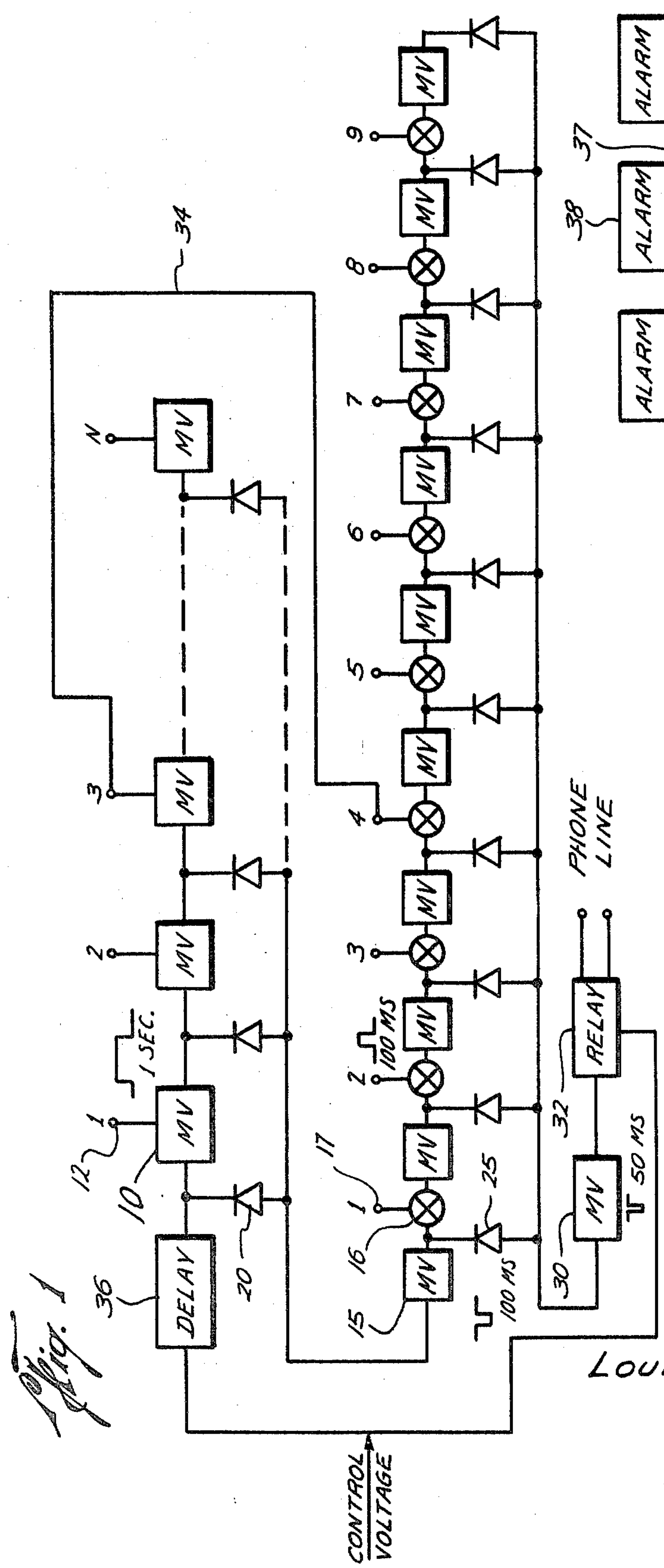
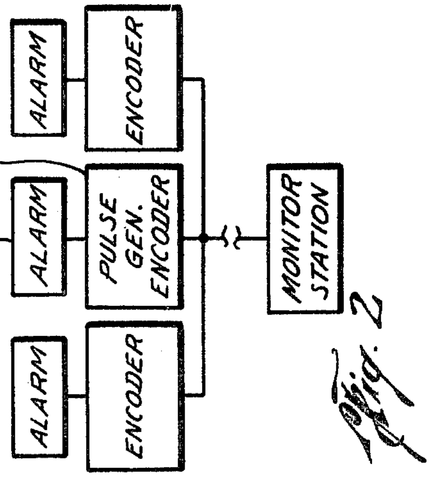
Fig. 2
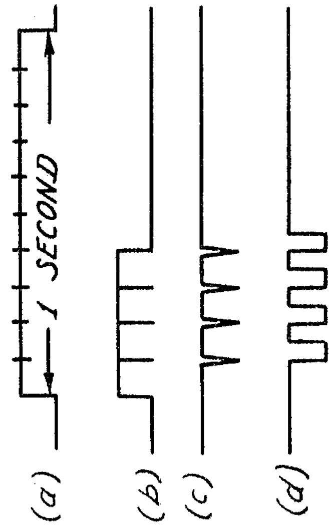
Fig. 3
Louis A. Stevenson, Jr.
INVENTOR
BY Arnold, Roylance, Kruger & Durkee
ATTORNEYS Louis A. Stevenson, Jr.
INVENTOR BY Arnold, Roylance, Kruger & Durkee
ATTORNEYS

PULSE GENERATOR AND ENCODER

Background of the Invention

This invention relates to pulse generating and encoding devices, and in particular to apparatus for developing a pulse code representation of a plural digit number. The apparatus has particular application in an automatic telephone dialing system, but is not limited thereto.

When a telephone number is dialed, an electronic pulse train is generated with each digit of the number being represented by a set of one to 10 50-millisecond pulses spaced 50 milliseconds apart. Present telephone dialing equipment requires mechanical equipment such as a simple rotary dial or more complex magnetic tape equipment.

With the advent of automatic data transmitting and receiving equipment, automatic electronic dialing equipment becomes necessary. Electronic pulse generators designed to generate a specified train of pulses are available; however, such equipment is too complex and expensive for telephone dialing which may require 70 or more pulses with specific spacing for each dialed number.

Thus, there has developed a need for simple and inexpensive apparatus for automatically developing a pulse train corresponding to a specific number. Summary of the Invention The present invention is a relatively simple pulse generator and encoder which develops a specific pulse train for a programmed input number in response to an initiating event such as the actuation of a burglar alarm, fire alarm means or the like.

Broadly, the pulse generating apparatus includes a plurality of pulse generating means serially connected through gate means whereby the generation of a pulse by one of the pulse generating means produces a trigger pulse which may be transmitted through the gate means to the succeeding pulse generating means. Means responsive to the actuation of the alarm triggers the first pulse generating means, and means are provided for selectively and sequentially opening the gate means. Means are connected to the plurality of pulse generating means for receiving a pulse train.

More specifically, the apparatus includes a plurality of serially connected monostable circuits corresponding in number to the number of digits in the programmed number. The output of each circuit is connected to the input of the succeeding circuit so that when the first circuit is triggered by an input signal and changes to its unstable state, all of the succeeding circuits sequentially change to their unstable states, thereby creating a series of pulses of a first duration each.

A second plurality of serially connected monostable circuits is provided with gate means connected between the output of each circuit and the input of the succeeding circuit. The period or duration of the unstable state for each of the second plurality of circuits times the number of second circuits is no greater than the first duration for the unstable state of each of the first plurality of circuits.

Each of the first plurality of circuits is connected to the input of the first circuit of the second plurality of circuits whereby a trigger pulse is applied to the first circuit in response to the change of state of each of the first plurality of circuits. Each of the first plurality of circuits is connected to a gate means in accordance with the programmed number whereby a gate means is rendered nonconductive when one of the first plurality of circuits is in the unstable state.

Means are connected to each of the second plurality of monostable circuits for receiving a pulse when each of the second plurality of circuits is triggered. The pulses so received define the pulse train corresponding to the programmed number.

The invention will be more fully understood from the following detailed description and appended claims when taken with the drawings. Brief Description of the Drawings FIG. 1 is a block diagram of one embodiment of the invention.

FIG. 2 is a block diagram of an alarm system employing the pulse generator and encoder of this invention.

FIGS. *3a—3d* are time-related voltage curves illustrating the operation of the apparatus shown in FIG. 1.

FIG. 4 is a schematic circuit diagram of a portion of the apparatus shown in FIG. 1. Description of the Illustrated Embodiments Referring now to FIG. 1 of the drawings, a block diagram of an embodiment of the invention is illustrated. A first plurality of monostable circuits 10 are serially connected with the output of each circuit connected to the input of the succeeding circuit so that when one circuit changes from the unstable state back to the stable state a trigger pulse is applied to the succeeding circuit. The period of the unstable state for each of the circuits is one second, for example. Each of the monostable circuits 10 has a terminal 12 from which the output pulse of the circuit can be taken. The terminals are numbered 1, 2, 3—N and correspond to the first, second, third—Nth digit of the number to be programmed.

Similarly, a second plurality of monostable circuits 15 are serially connected with a gate 16 connecting the output of one circuit with the input of the succeeding circuit. Ten circuits are shown, but the number of circuits could be increased or decreased, if desired. Each gate is normally conductive and is rendered nonconductive by the application of a suitable bias voltage on the control terminal 17 of the gate. The control terminals are numbered 1—9 and correspond to the value of each digit of a number to be programmed. Each of the circuits 15 has an unstable state of 100 milliseconds duration, for example. Accordingly, all of the monostable circuits 15 can be sequentially triggered during the unstable period of each of the monostable circuits 10.

Each of the circuits 10 is connected through diodes 20 to the input of the first circuit 15 in the second plurality of monostable circuits whereby a trigger pulse is applied to the circuit 15 when each of the circuits 10 receives a trigger pulse.

The second plurality of monostable circuits 15 are connected through diodes 25 to the input of a monostable circuit 30 whereby a trigger pulse is delivered to the circuit 30 after each of the circuits 15 is triggered. When triggered, circuit 30 has an unstable state of 50 milliseconds, thereby generating a 50-millisecond pulse at its output. Circuit 30 is connected to a telephone line holding relay 32.

In operation, the pulse generator and encoder may be employed in an alarm system as illustrated by the block diagram of FIG. 2. A plurality of the encoders 37 are operatively connected to alarms 38 which may be burglar alarms, fire alarms or other fail-safe type alarms. When an alarm 38 is actuated, a control voltage is applied to an encoder 37 which applies a pulse train corresponding to a number to a communication link, either telephone or radio, which "dials" a telephone at the monitor station 39. Frequency of Identification Tone identifies the caller. Thereafter, a message may be transmitted to the monitoring station if desired.

Referring again to FIG. 1, the number is pro programmed by connecting the terminals 12 of circuits 10, which correspond to the first, second, etc., digit of the number, to control terminals 17 of the gates 16, which correspond to the value of each digit. For example, if the third digit of the programmed number is a "4," a connection is made between the terminal 12 of the third monostable circuit 10 of the first plurality of circuits to the control electrode 17 of the fourth gate in the second plurality of circuits, such as shown by jumper wire 34 in FIG. 1, for example.

A pulse train corresponding to the programmed number is generated when the DC control voltage is applied to the circuit. The control voltage actuates line-holding relay 32, and is also applied to a delay circuit 36 which develops a trigger pulse which is applied to the first monostable circuit 10. Delay circuit 36 is especially useful in telephone operations as the delay allows time for the dial tone to be applied to the telephone line by the exchange after relay 32 is actuated and before the pulse train for the programmed number is generated. When the trigger pulse is delivered to circuit 10, a trigger pulse is also applied to the input of the first monostable circuit 15 of the second plurality of monostable circuits through a diode 20. During the period of the unstable state of the first circuit 10, the circuits 15 are sequentially triggered until a nonconducting gate 16 is encountered. Each of the circuits 15 which is triggered develops a pulse which is applied through a diode 25 and triggers the 50-millisecond monostable circuit 30. Circuit 30 develops a train of pulses 50 milliseconds long and spaced 50 milliseconds, as required to dial a number on automatic telephone exchange equipment. These pulses interrupt the current in the line-holding relay 32 causing 50-millisecond openings of the telephone line.

After 1 second, the first monostable circuit returns to its stable state and generates a trigger pulse for the second circuit 10. Again, a trigger pulse is applied through a diode 20 to the input of the first circuit 15 of the second plurality of monostable circuits. The described operation continues until a pulse train for each digit of the programmed number is generated.

The pulse relationship of the several monostable circuits may be seen from the curves in FIGS. 2*a*—2*d*. The curves illustrate the development of a pulse train for the third digit of a programmed number which has a value "4." A connection is made between the terminal 12 of the third circuit of the first plurality of monostable circuits 10 to the control terminal 17 of the fourth gate in the second serially connected monostable circuits 15, as shown in FIG. 1. FIG. 2*a* is the 1-second pulse developed by the third monostable circuit 10. The trigger pulse which was applied to the third circuit 10 is also applied through diode 20 to the first circuit 15 in the second plurality of monostable circuits. The first, second, third and fourth circuits in the group of circuits 15 are sequentially triggered and develop sequential 100-millisecond pulses, as shown in FIG. 2*b*. Sharp negative pulses, as shown in FIG. 2*c*, are developed from the negative-going back edge of each of the pulses in FIG. 2*b*. The sharp pulses are used to trigger the succeeding monostable circuit 15, assuming the connecting gate is conductive, and the pulses are also applied through diodes 25 to trigger circuit 30. When triggered, circuit 30 develops 50-millisecond pulses spaced 50 milliseconds apart, as shown in FIG. 2*d*. Thus, a pulse train of four 50-millisecond pulses spaced 50 milliseconds apart is developed by circuit 30 which corresponds to the value "4" for the third digit of the programmed number.

Similarly, a pulse train of one to nine pulses is developed for the values 1—9, respectively, and 10 pulses are developed for a zero value, as required to dial a number on automatic telephone exchange equipment. The pulse train is then applied to relay 32, as described above, thereby causing 50-millisecond openings of the telephone line.

After the programmed number is "dialed," relay 32 holds the telephone line as long as the control voltage is applied, and messages or data may then be transmitted. The line is released when the control voltage is removed.

FIG. 4 is a schematic diagram of a portion of the circuit shown in FIG. 1. The monostable circuits are one-shot multivibrators, and to avoid repetition and simplify the circuit, only two multivibrator circuits are shown in the first plurality of circuits and only three multivibrator circuits and three gates are shown in the second plurality of circuits. It will be understood that additional multivibrator circuits can be added, as required.

The encoding circuit is shown connected with a burglar alarm system to "dial" a programmed number in response to a security violation. When actuated, the positive DC alarm voltage supplies a current through line-holding relay 40 and forward biased transistor 41 to ground, which actuates the relay and closes switch 42 in the telephone line. As soon as switch 42 is closed, an identification tone from a conventional tone generator 44 is applied through transformer 45 to the telephone line.

The alarm voltage is also applied through resistor 48 to capacitor 49 in the delay circuit. As the voltage increases across capacitor 49 to the threshold voltage of unijunction transistor 50, the transistor becomes conductive and a gating current flows through the unijunction transistor and diode 51 to the control electrode of controlled rectifier 52. The controlled rectifier becomes conductive, and current flows through the controlled rectifier and resistor 53 to ground. When the alarm voltage is developed across resistor 53, a positive trigger pulse is developed by capacitor 55 and applied to the input of the first monostable circuit of the first plurality of circuits. The circuit is a conventional one-shot multivibrator comprising reverse biased NPN transistor 56 and forward biased transistor 57. The input trigger pulse forward biases transistor 56 which in turn reverse biases transistor 57. A one-second positive pulse, as determined by the resistor and capacitor in the base circuit of transistor 57, is produced at the collector of transistor 57.

When transistor 56 is forward biased, a negative pulse is transmitted through capacitor 58, diode 59 and capacitor 60 to the first circuit in the second plurality of monostable circuits. Similarly, when transistor 57 returns to the forward biased state, a negative pulse is transmitted through capacitor 62, diode 63 and capacitor 60 to the first circuit in the second plurality of circuits. The negative pulse is also passed through capacitor 65 to the second circuit of the first plurality of monostable circuits, which includes NPN transistors 66 and 67, and reverse biases the normally conducting transistor 67. The sequential triggering continues for all of the circuits in the first plurality of monostable circuits.

The first circuit of the second plurality of monostable circuits is a one-shot multivibrator with a pulse duration of 100 milliseconds and includes NPN transistors 70 and 71. Upon receiving a negative trigger pulse, normally conducting transistor 71 is reverse biased and transistor 70 is then forward biased. After 100 milliseconds transistor 71 is again forward biased, and the negative going potential on the collector of transistor 71 generates a negative trigger pulse which is passed through capacitor 73, diode 74 and capacitor 75 to the input of the second circuit of the second plurality of monostable circuits. Diode 74 will pass the negative pulse unless a positive potential is applied to the cathode thereof from a control terminal 76 and through resistor 77. When diode 74 is reverse biased, the negative pulse is not conducted therethrough, and the diode thus functions as a gate. As described above, the positive potential applied through to the gate is generated by one of the first plurality of circuits.

The negative going potential on the collector of transistor 71 also generates a pulse which is transmitted through capacitor 80, diode 81, and capacitor 82 to the 50-millisecond multivibrator circuit which includes NPN transistors 84 and 85. The collector of transistor 84 is connected through resistor 86 to the base of transistor 41 in the circuit of line-holding relay 40. Whenever the 50-millisecond circuit is triggered to the unstable state, transistor 41 is reverse biased and thus interrupts the current in relay 40 causing 50!-millisecond openings of the telephone line.

It will be realized by those skilled in the art that other types of one-shot multivibrator or monostable circuits and other gates can be readily employed in the apparatus. The described embodiment is illustrative and not to be construed as limiting the scope of the invention. These and other changes may occur to those skilled in the art without departing from the spirit and scope of the invention as defined by the appended claims.

I claim:

1. A pulse generating circuit comprising:

a. a plurality of serially connected first monostable circuits;

b. a plurality of serially connected second monostable circuits with gate means between said second monostable circuits;

c. means connecting each of said first monostable circuits to the first circuit of said plurality of serially connected second monostable circuits;

d. means for connecting each of said first monostable circuits to a control terminal of said gate means; and e. means connected to each of said second monostable circuits for receiving a pulse train.

2. A pulse generating circuit in accordance with claim 1 wherein said first and second monostable circuits are one-shot multivibrators.

3. A pulse generating circuit in accordance with claim 2 wherein the time duration of each pulse generated by said second monostable one-shot multivibrator circuits multiplied by the number of said second multivibrator circuits is no greater than the time duration of each pulse generated by said first one-shot multivibrator circuits.

4. A pulse generating circuit in accordance with claim 1 wherein said first monostable circuits are 1-second one-shot multivibrators, said second monostable circuits are 100 millisecond one-shot multivibrators, and said means for receiving a pulse train is a 50-millisecond one-shot multivibrator.

5. A pulse generating circuit comprising:

a. a plurality of first monostable circuits each having an unstable state of a first duration, said first monostable circuits being serially connected so that the triggering of the first monostable circuit will sequentially trigger other first monostable circuits;

b. a plurality of second monostable circuits each having an unstable state of second duration, said second duration multiplied by the number of second monostable circuits being no greater than said first duration, said second monostable circuits being serially connected through gate means so that the triggering of the first monostable circuit of the plurality of second monostable circuits will sequentially trigger other second monostable circuits until a nonconducting gate means prevents the transmission of a trigger pulse;

c. means connecting each of said first monostable circuits to the first circuit of said plurality of second monostable circuits whereby a trigger pulse is delivered to said first circuit of said plurality f second monostable circuits corresponding to the delivery of a trigger pulse to each of said first monostable circuits;

d. means for connecting each of said first monostable circuits to a control terminal of said gate means whereby a voltage is delivered to said control terminal which renders said gate means nonconductive when one of said first monostable circuits is in the unstable state, and e. means connected to each of said second monostable circuits for receiving a pulse train in response to the triggering of said second monostable circuits.

6. A pulse generating circuit in accordance with claim 5 wherein said first and second monostable circuits are one-shot multivibrators.

7. A pulse generating circuit in accordance with claim 5 wherein said first monostable circuits are 1-second one-shot multivibrators, said second monostable circuits are 100-millisecond one-shot multivibrators, and said means for receiving a pulse train is a 50-millisecond one-shot multivibrator.

8. A pulse generating circuit comprising:

a. a plurality of pulse generating means;

b. a plurality of gate means;

c. said pulse generating means being serially connected through said gate means whereby the generation of a pulse by one of said pulse generating means produces a trigger pulse which may be transmitted through said gate means to the succeeding pulse generating means, each of said plurality of pulse generating means being a first monostable circuit;

d. means for triggering the first pulse generating means, e. a plurality of serially connected second monostable circuits for selectively and sequentially closing and opening said gate means, and f. means connected to said plurality of pulse generating means for receiving a pulse train.